US011187574B2

(12) United States Patent
Abou Mahmoud et al.

(10) Patent No.: US 11,187,574 B2
(45) Date of Patent: Nov. 30, 2021

(54) SMART TABLE SENSOR ENVIRONMENT

(71) Applicant: INTERNATIONAL BUSINESS MACHINES CORPORATION, Armonk, NY (US)

(72) Inventors: Alaa Abou Mahmoud, Dracut, MA (US); Mahjabeen Huq, Jersey City, NJ (US); Vignesh Kumaresan, Cambridge, MA (US); Shaila Pervin, Docklands (AU)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 16/145,762

(22) Filed: Sep. 28, 2018

(65) Prior Publication Data

US 2020/0103271 A1   Apr. 2, 2020

(51) Int. Cl.
| | | |
|---|---|---|
| *G01G 19/415* | (2006.01) | |
| *G01G 19/52* | (2006.01) | |
| *A47B 21/00* | (2006.01) | |
| *G06Q 50/12* | (2012.01) | |
| *G06K 19/077* | (2006.01) | |
| *H04W 4/80* | (2018.01) | |
| *G01G 23/37* | (2006.01) | |
| *G01G 21/22* | (2006.01) | |
| *G01G 19/414* | (2006.01) | |

(52) U.S. Cl.
CPC ............ *G01G 19/52* (2013.01); *A47B 21/00* (2013.01); *G01G 19/415* (2013.01); *G01G 23/3735* (2013.01); *G06Q 50/12* (2013.01); *H04W 4/80* (2018.02); *G01G 19/4144* (2013.01); *G01G 21/22* (2013.01); *G06K 19/07749* (2013.01)

(58) Field of Classification Search
CPC .. G01G 19/52; G01G 19/415; G01G 23/3735; G01G 21/22; G01G 19/4144; H04W 4/80; A47B 21/00; G06K 19/07749
USPC ......................................................... 177/25.16
See application file for complete search history.

(56) References Cited

U.S. PATENT DOCUMENTS

| | | | | | |
|---|---|---|---|---|---|
| 5,033,561 | A | * | 7/1991 | Hettinger | ........... G01G 19/4146 |
| | | | | | 177/25.16 |
| 5,388,043 | A | * | 2/1995 | Hettinger | ........... G01G 19/4146 |
| | | | | | 128/921 |

(Continued)

OTHER PUBLICATIONS

Anonymous, "Grocery Shopping Cart Component for Tracking of Nutrition," An IP.com Prior Art Database Technical Disclosure, Mar. 24, 2018, p. 1-3, IP.com No. IPCOM000253355D.

(Continued)

*Primary Examiner* — Randy W Gibson
(74) *Attorney, Agent, or Firm* — Kristofer L. Haggerty

(57) ABSTRACT

A computer-implemented method for operating a set of electronic sensors. The method includes detecting, by one or more sensors embedded in a table, that a tray associated with a user is placed on the table. The method further includes detecting, by the one or more sensors embedded in the table, a first weight of contents on the tray at a first time, and detecting, by the one or more sensors embedded in the table, a second weight of the contents on the tray at a second time. The method further includes determining a final weight of the contents on the tray when the tray is no longer associated with the user.

18 Claims, 5 Drawing Sheets

(56) References Cited

U.S. PATENT DOCUMENTS

| | | | |
|---|---|---|---|
| 7,375,294 B2* | 5/2008 | Kraft | G01G 19/4144 |
| | | | 177/25.15 |
| 7,432,454 B1* | 10/2008 | Sze | G01G 19/4146 |
| | | | 177/25.16 |
| 9,364,106 B1* | 6/2016 | Ortiz | A47G 19/027 |
| 10,288,471 B2* | 5/2019 | Adams | G01G 17/00 |
| 2013/0113933 A1 | 5/2013 | Boushey et al. | |
| 2015/0168365 A1* | 6/2015 | Connor | G16H 20/60 |
| | | | 356/51 |
| 2015/0371317 A1 | 12/2015 | Bosko et al. | |
| 2016/0217536 A1 | 7/2016 | Camp | |
| 2017/0046801 A1 | 2/2017 | Byron et al. | |
| 2017/0076249 A1 | 3/2017 | Byron et al. | |

OTHER PUBLICATIONS

Fingas, "IKEA's Future Kitchen Tells You How to Cook," Engadget, Apr. 20, 2015, p. 1-3, Oath Tech Network Aol Tech, https://www.engadget.com/2015/04/20/ikea-concept-kitchen-2025/, Accessed on Sep. 6, 2018.

Manton et al., "The "Smart Dining Table": Automatic Behavioral Tracking of a Meal with a Multi-Touch-Computer," Frontiers in Psychology, Feb. 11, 2016, p. 1-9, vol. 7, Article 142.

Mell et al., "The NIST Definition of Cloud Computing," National Institute of Standards and Technology, Sep. 2011, p. 1-3, Special Publication 800-145.

\* cited by examiner

SMART TABLE SENSOR ENVIRONMENT

BACKGROUND

Embodiments of the present invention relate generally to the field of computing and more particularly to data processing and tracking food consumption, and food waste, of one or more users.

Food management information is important for organizations and businesses that handle food preparation and ordering for many people (e.g., community groups, employees, restauranteurs, supermarkets, and so forth) because this information may be analyzed and used to optimize the amount and type of food that is delivered.

Currently, it is difficult to gauge how much food will be consumed by a certain group of people, so more often than not, too much or too little food is provided, which either leads to an excess of wasted food or unhappy customers due to a lack of food.

SUMMARY

Embodiments of the invention include a method, computer program product, and system, for tracking food consumption, and food waste, of one or more users.

A method, according to an embodiment, for operating a set of electronic sensors which includes detecting, by one or more sensors embedded in a table, that a tray associated with a user is placed on the table; detecting by the one or more sensors embedded in the table, a first weight of contents on the tray at a first time; detecting, by the one or more sensors embedded in the table, a second weight of the contents on the tray at a second time; and determining a final weight of the contents on the tray when the tray is no longer associated with the user.

A computer program product, according to an embodiment of the invention, includes a non-transitory tangible storage device having program code embodied therewith. The program code is executable by a processor of a computer to perform a method. The method includes detecting, by one or more sensors embedded in a table, that a tray associated with a user is placed on the table; detecting by the one or more sensors embedded in the table, a first weight of contents on the tray at a first time; detecting, by the one or more sensors embedded in the table, a second weight of the contents on the tray at a second time; and determining a final weight of the contents on the tray when the tray is no longer associated with the user.

A computer system, according to an embodiment of the invention, includes one or more computer devices each having one or more processors and one or more tangible storage devices; and a program embodied on at least one of the one or more storage devices, the program having a plurality of program instructions for execution by the one or more processors. The program instructions implement a method. The method includes detecting, by one or more sensors embedded in a table, that a tray associated with a user is placed on the table; detecting by the one or more sensors embedded in the table, a first weight of contents on the tray at a first time; detecting, by the one or more sensors embedded in the table, a second weight of the contents on the tray at a second time; and determining a final weight of the contents on the tray when the tray is no longer associated with the user.

DETAILED DESCRIPTION

As previously described, preparing/cooking a large amount of food for a group of individuals may be hard to gauge. As such, food management information is critical in order to optimize the amount and type of food that is delivered.

An embodiment of the present invention is a smart community table that has the ability to track consumer behavior through the use of sensors in the smart table. These sensors are able to calculate the weight of food that is placed on the smart table, and calculate the food consumed during an eating session (i.e., the difference between the initial food weight and the final food weight) for each consumer. By recording consumer eating habits (e.g., quantity, type of food, etc.) over a period of time, the present invention may provide community organizations, restaurants, and other food industry providers with informed insights into consumer food consumption based on various factors such as day of the week, time of day, and so forth. Based on these consumer food consumption insights, food portions may be modified to save money and be more efficient.

Hereinafter, exemplary embodiments of the present invention will be described in detail with reference to the accompanying drawings.

The present invention is not limited to the exemplary embodiments below, but may be implemented with various modifications within the scope of the present invention. In addition, the drawings used herein are for purposes of illustration, and may not show actual dimensions.

Figure 1:
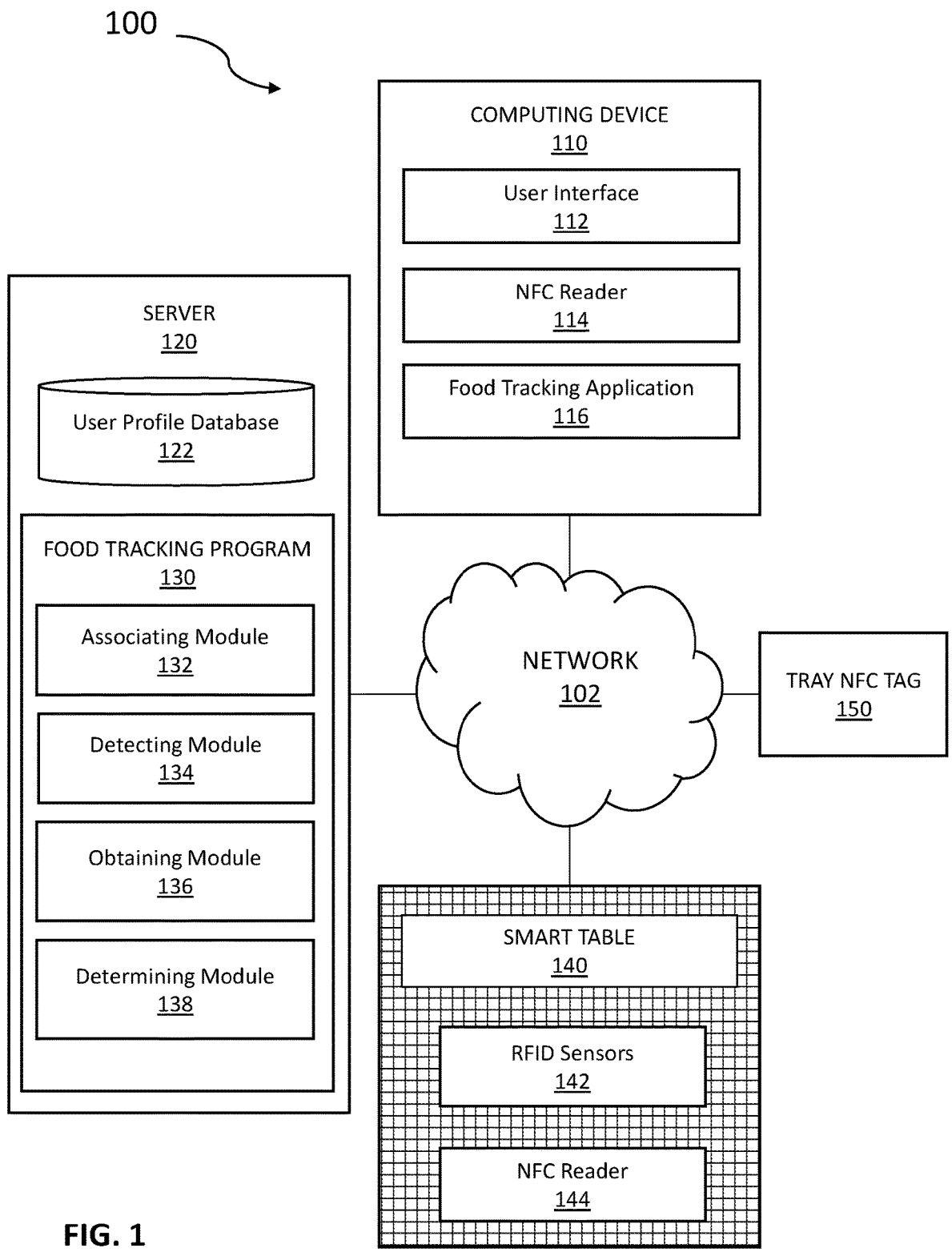
FIG. 1 illustrates a food tracking computing environment, in accordance with an embodiment of the present invention.

FIG. 1 illustrates food tracking computing environment 100, in accordance with an embodiment of the present invention. Food tracking computing environment 100 includes computing device 110, server 120, smart table 140, and tray near-field communication (NFC) tag 150, all connected via network 102. The setup in FIG. 1 represents an example embodiment configuration for the present invention, and is not limited to the depicted setup in order to derive benefit from the present invention.

In an exemplary embodiment, computing device 110 contains user interface 112, NFC reader 114, and food tracking application 116. In various embodiments, computing device 110 may be a laptop computer, tablet computer, netbook computer, personal computer (PC), a desktop computer, a personal digital assistant (PDA), a smart phone, or any programmable electronic device capable of communicating with server 120, smart table 140, and tray NFC tag 150, via network 102. Computing device 110 may include internal and external hardware components, as depicted and described in further detail below with reference to FIG. 3. In other embodiments, computing device 110 may be implemented in a cloud computing environment, as described in relation to FIGS. 4 and 5, herein. Computing device 110 may also have wireless connectivity capabilities allowing it to communicate with server 120, smart table 140, and tray NFC tag 150, as well as other computers or servers over network 102.

In an exemplary embodiment, user interface 112 may be a computer program that allows a user to interact with computing device 110 and other connected devices via network 102. For example, user interface 112 may be a graphical user interface (GUI). In addition to comprising a computer program, user interface 112 may be connectively coupled to hardware components, such as those depicted in FIG. 3, for receiving user input. In an exemplary embodiment, user interface 112 may be a web browser, however in other embodiments user interface 112 may be a different program capable of receiving user interaction and communicating with other devices.

In an exemplary embodiment, NFC reader 114 may enable computing device 110 to act like a smart card or smart identification (ID) tag, allowing a user to perform transactions such as payment or ticketing. In further exemplary embodiments, NFC reader 114 may enable computing device 110 to wirelessly read information stored on NFC tags embedded in labels, chips, stickers, posters, and objects such as tray NFC tag 150 and smart table 140.

In alternative embodiments, computing device 110 may communicate with a user's tray via Bluetooth® (Bluetooth and all Bluetooth-based trademarks and logos are trademarks or registered trademarks of Bluetooth SIG, Inc. and/or its affiliates), Wireless Fidelity (WiFi), Radio-Frequency Identification (RFID), and any other wireless radio communication standard known to one of ordinary skill in the art.

In an exemplary embodiment, food tracking application 116 may be a web browser or other computer program, on computing device 110, that is capable of receiving real-time data from food tracking program 130 on server 120. Food tracking application 116, in an exemplary embodiment, may be capable of accessing user profile database 122 to view food consumption history of a user, food waste history of a user, and categories of food consumption and food waste of a user (e.g., vegetables, poultry, dairy, sugars, etc.). In alternative embodiments, user profile database 122 may depict dietary restrictions of a user, daily calories consumed by a user, diet goals of a user, and so forth.

In an exemplary embodiment, food tracking application 116 may receive food tracking data for a user or a group of users, from food tracking program 130, and display the received data on computing device 110. For example, food tracking application 116 may contain a calendar that depicts an amount of food consumed by the user, or group of users, for a given day/month/year, according to a food-criteria (i.e., vegetables, carbohydrates, proteins, sugars, and so forth). In exemplary embodiments, the food tracking application 116 may only display information for a specific user, or a group of users, based on various levels of security access.

With continued reference to FIG. 1, server 120 contains user profile database 122 and food tracking program 130, and may be a laptop computer, tablet computer, netbook computer, personal computer (PC), a desktop computer, a personal digital assistant (PDA), a smart phone, or any programmable electronic device capable of communicating with computing device 110, smart table 140, and tray NFC tag 150, via network 102. While server 120 is shown as a single device, in other embodiments, server 120 may be comprised of a cluster or plurality of computing devices, working together or working separately. In a preferred embodiment, server 120 may be implemented in a cloud computing environment, as described in relation to FIGS. 4 and 5, herein.

In an exemplary embodiment, user profile database 122 is a database storage that contains the food consumption data for various users, or groups of users such as community organizations, patrons at a restaurant, a theme park, a school dining hall, and so forth. User profile database 122, in exemplary embodiments, may be capable of being updated dynamically based on information received from smart table 140, tray NFC tag 150, or by any other means of tracking an individual's food consumption, together with food waste information, and transmitting the food consumption, together with food waste, information to food tracking program 130, known to one of ordinary skill in the art.

In exemplary embodiments, user profile database 122 may store food consumption history, and food waste history, information as data objects according to a user, a group of users, a venue, a day of the week, a timeframe, an initial amount of food by weight during an eating session, a final amount of food by weight during an eating session, a type of dietary plan, and so forth. In exemplary embodiments, an eating session includes a single meal time of a user (e.g., breakfast, lunch, dinner) or a designated time for delivery of food portions to one or more consumers (e.g., fundraising event meal, concert, ball game, and so forth).

In various embodiments, user profile database 122 may be capable of being stored on server 120, computing device 110, or food tracking program 130, as a separate database.

In an exemplary embodiment, food tracking program 130 contains instruction sets, executable by a processor, which may be described using a set of functional modules. The functional modules of food tracking program 130 include associating module 132, detecting module 134, obtaining module 136, and determining module 138.

In an exemplary embodiment, smart table 140 includes Radio-Frequency Identification (RFID) sensors 142 and Near-Field Communication (NFC) reader 144, and may be a table, a desk, a platform, or any other physical space capable of containing RFID sensors 142 and NFC reader 144.

In exemplary embodiments, the RFID sensors 142 may be arranged in a grid format on the table, the desk, the platform, or the other physical space holding the RFID sensors 142. In alternative embodiments, the RFID sensors 142 may be arranged in any other format capable of detecting a physical object either on top of, or within a proximity of, the RFID sensors 142.

In exemplary embodiments, smart table 140 is capable of communicating with computing device 110, server 120, and tray NFC tag 150, via network 102. While smart table 140 is shown as a single entity, in other embodiments, smart table 140 may be comprised of a cluster or plurality of entities, working together or working separately.

In an exemplary embodiment, NFC reader 144 may be a component on smart table 140 that is capable of communicating with tray NFC tag 150. In alternative embodiments, smart table 140 may communicate with a user's tray via Bluetooth® (Bluetooth and all Bluetooth-based trademarks and logos are trademarks or registered trademarks of Bluetooth SIG, Inc. and/or its affiliates), Wireless Fidelity (WiFi), Radio-Frequency Identification (RFID), and any other wireless radio communication standard known to one of ordinary skill in the art.

In an exemplary embodiment, NFC reader 144 may enable smart table 140 to wirelessly receive information from tray NFC tag 150, which is associated with a user's identification (ID) tag or computing device, such as computing device 110. A purpose of NFC reader 144, or any other wireless radio communication standard associated with smart table 140, may be to associate a specific tray with a specific user at smart table 140, via tray NFC tag 150.

Identification of a user at smart table 140 is not limited to NFC technology and an ID tag of a user. In further embodiments, smart table 140 may include mounted cameras that use facial recognition technology to identify a specific user, together with the user's associated tray.

In exemplary embodiments, trays include a tray NFC tag 150. Tray NFC tag 150 may be capable of communicating with NFC reader 114, on computing device 110, and NFC reader 144, on smart table 140. In this fashion, tray NFC tag 150 is associated with a specific user's tray at a specific smart table 140. As such, food tracking program 130 is capable of collecting food consumption, and food waste, data for the contents of a tray of food associated with a specific user in real-time. For example, smart table 140 may associate a final weight of a user's tray after the user has finished a food consumption session, and transmit the food consumption data to a user profile on food tracking application 116, user profile database 122, and food tracking program 130 in real-time over network 102.

In exemplary embodiments, a user may be required to scan a user ID tag when they sit at smart table 140, thereby attaching their food data collection to a unique user ID tag. The user's unique user ID tag, as discussed earlier, may be stored on a user's computing device, such as computing device 110. In various embodiments, a user's unique ID may be provided by food tracking application 116, such as a Personal Identification Number (PIN), a cookie, a username and password, a serial number associated with a user's computing device, or any other user identification tracking known to one of ordinary skill in the art.

In alternative embodiments, a user's ID may be a scan badge, a fingerprint, a retinal scan, facial recognition, weight sensors, or any other form of identifying and matching a user with a particular seat, or space, at or near smart table 140.

In alternative embodiments, trays may include a location tracking device or Global Positioning System (GPS) that pairs with computing device 110 of a user. In further embodiments, facial recognition via cameras that are mounted to a smart table 140, as well as the food serving areas, may associate a specific user with a specific tray.

Figure 2:
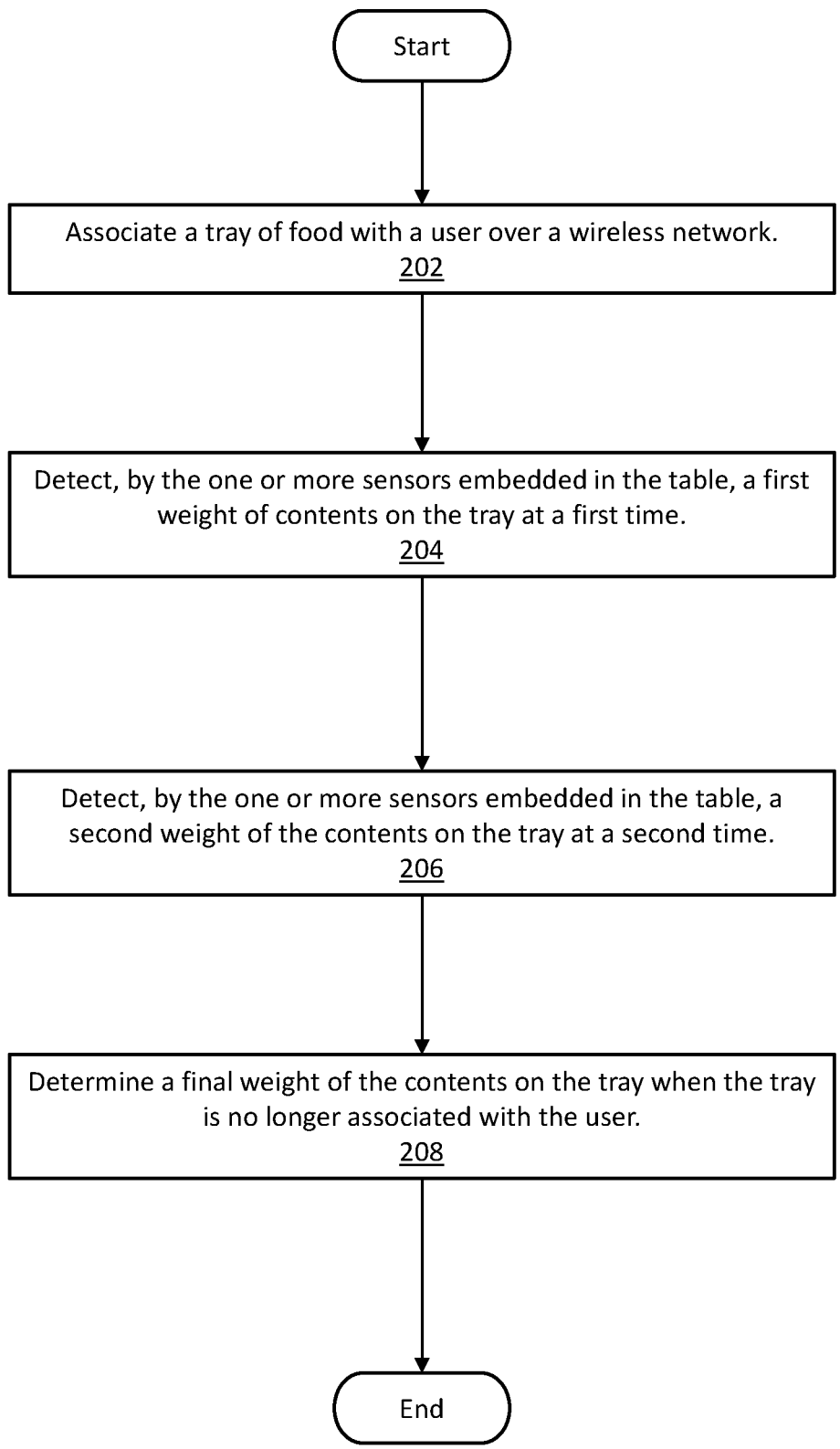
FIG. 2 is a flowchart illustrating the operation of food tracking program 130, in accordance with an embodiment of the present invention.

FIG. 2 is a flowchart illustrating the operation of food tracking program 130, in accordance with an embodiment of the present invention.

Referring now to FIGS. 1 and 2, associating module 132 includes a set of programming instructions in food tracking program 130. The set of programming instructions is executable by a processor. Associating module 132 associates a tray with a user over a wireless network (step 202). In exemplary embodiments, associating module 132 associates the tray with a user via an ID tag of the user, which may be a user's computing device, such as computing device 110. The tray may comprise an NFC chip that communicates with a device of the user to form an association between the tray and the user.

In further embodiments, the table may comprise an NFC chip that communicates with a device of the user to form an association between the table and the user.

In alternative embodiments, associating module 132 may associate the tray with a user based on a location tracking device on the tray that is capable of being paired with a computing device 110 of the user.

In exemplary embodiments, associating module 132 further associates a user with a smart table 140. For example, a user may hold their computing device 110 (or ID tag associating a user with a tray), containing NFC reader 114, within a certain range of smart table 140 in order to be recognized. For example, such as with Bluetooth® or WiFi, a computing device 110 of the user may be automatically detected when a user occupies a particular seat at or near smart table 140.

In alternative embodiments, as discussed earlier, associating module 132 may be capable of associating a user with a smart table 140 based on facial recognition technology using cameras that are mounted at smart table 140, or via sensors. In further embodiments, associating module 132 may be capable of associating a user with a smart table 140 based on any other known technology, familiar to one of ordinary skill in the art, to identify a user.

With reference to an illustrative example, Joe is an employee at a corporation. The corporation provides buffet lunches to their employees during the week. In order to determine how much food to prepare for the weekday employee lunches, the corporation uses the subject application to analyze historical employee food consumption and food waste. In order to collect food data, the trays in the cafeteria contain sticker NFC tags. Joe holds his ID tag, which contains an NFC reader 114, up to his tray. Joe's tray is now associated with his unique user ID tag. Furthermore, when Joe sits down at the cafeteria smart table 140, associating module 132 associates Joe and his tray with the specific smart table 140 via NFC reader 144 that identifies Joe by his user ID tag.

In exemplary embodiments, associating module 132 is capable of continuously associating the ID tag of the user with the tray of food on the table when the user switches from one seat to another seat at the table. In alternative embodiments, cameras mounted to smart table 140 are capable of continuously associating the presence of a user, together with the user's tray of food on the smart table 140, even when the user switches seats or switches tables.

With continued reference to FIGS. 1 and 2, detecting module 134 includes a set of programming instructions in food tracking program 130. The set of programming instructions is executable by a processor. Detecting module 134 detects, by one or more sensors embedded in a table, that a tray associated with a user is placed on the table.

In exemplary embodiments, detecting module 134 detects, by the one or more sensors embedded in the table, a first weight of contents on the tray at a first time (step 204), and detects, by the one or more sensors embedded in the table, a second weight of the contents on the tray at a second time (step 206).

In exemplary embodiments, the one or more sensors embedded in the table, such as smart table 140, are arranged in a grid, wherein the grid includes one or more squares and one or more radio frequency identification (RFID) sensors associated with each of the one or more squares.

In further embodiments, the one or more sensors embedded in the table detect a weight and temperature of the contents on the tray placed on the table, such as smart table 140.

Detecting module 134 is further capable of detecting a type of food that a user chooses to place on their respective tray. For example, each food station may include a camera and scale that detects when a user places their tray in front of a food serving station (e.g., salad, mashed potatoes, sloppy joe, etc.) and detects the weight increase of a user's tray at the particular food serving station. In this fashion, detecting module 134 is capable of tracking the specific food item on a user's tray, together with the weight of the particular food item on the user's tray. Alternatively, each food serving station may include a scale that detects an amount of food removed from the food serving station by a user, as well as an NFC chip scanner that wirelessly associates the specific removed food item, from the food serving station, with the user.

In exemplary embodiments, smart table 140 comprises a separate holder for one or more drinks, wherein drink consumption, by the user, for the one or more drinks, is tracked separately from the food consumption of the user.

With continued reference to the illustrative example above, Joe stops in front of the mashed potatoes on the buffet line and places his tray on the serving station scale. Joe puts a few scoops of mashed potatoes on his tray. Detecting module 134 detects that Joe's tray has increased in weight by a quarter of a pound. As such, food tracking program 130 records a quarter of a pound of mashed potatoes initially taken by Joe during his eating session. Joe sets his tray on smart table 140 and sits down to eat. The RFID sensors on smart table 140 calibrate (to account for the weight of the tray) and calculate the total weight of the food on Joe's tray, which refers to the initial weight of the tray. The initial weight of the tray may be itemized according to a weight of each specific food item on the tray. While eating, detecting module 134 tracks the weight decrease on Joe's tray. Since the RFID sensors only measure the weight of the NFC tagged tray, Joe is able to place his arms and other items (e.g., utensils, work notebook, etc.) on the smart table 140 without nixing, or confusing, the weight data collection.

With continued reference to FIGS. 1 and 2, obtaining module 136 includes a set of programming instructions in food tracking program 130. The set of programming instructions is executable by a processor. Obtaining module 136 detects, by the one or more sensors embedded in the table, a second weight of the contents on the tray at a second time (step 206).

In exemplary embodiments, obtaining module 136 may detect a second weight for the tray of the user by setting a time threshold for the eating session. For example, a typical eating session may last between 20 and 30 minutes. As such, the second weight of the tray of the user may be obtained after 30 minutes have elapsed since the user initially sat down at smart table 140.

In further embodiments, obtaining module 136 may be capable of terminating the eating session when the ID tag of the user is no longer associated with the tray of food on smart table 140, and transmitting the determined amount of food waste by the user, during the eating session. The ID tag of the user may be deemed to no longer be associated with the tray of food on smart table 140 when a threshold amount of time has elapsed since the user has been away from a pre-requisite distance of the tray or smart table 140, when the tray is no longer associated with smart table 140, or when the total calibrated weight of the tray is at zero.

In alternative embodiments, obtaining module 136 may be capable of terminating the eating session of a user when the cameras, or sensors, associated with smart table 140 no longer detect the presence of the user, or the tray of the user, at the smart table 140 for a threshold amount of time.

In exemplary embodiments, obtaining module 136 may be capable of recognizing that the user, and/or the tray of the user, are away from smart table 140 for a threshold amount of time. For example, if the user has left smart table 140 for over an hour, this may indicate that the user's meal is over.

In exemplary embodiments, obtaining module 136 may be capable of detecting that the user, and the associated tray of the user, are away from the table for a threshold amount of time, detecting, by the one or more sensors embedded in the table, that the tray of the user is placed on the table again, detecting, by the one or more sensors embedded in the table, a third weight of the contents on the tray at a third time, and determining a second final weight of the contents on the tray when the tray is no longer associated with the user, wherein the second final weight incorporates the third weight of the contents of the tray.

With continued reference to the illustrative example above, Joe finished half of his mashed potatoes, really likes the mashed potatoes, and decides to get up and get more mashed potatoes while the line is still short. Obtaining module 136 recognizes that Joe gets up and takes his tray away from the table. Obtaining module 136, however, detects that Joe has returned with his tray, this time with additional weight than when he left 10 minutes ago. Obtaining module 136 seamlessly incorporates the increased weight of Joe's tray with his existing eating session in order to provide an accurate final weight of food consumed, and food waste, when Joe ends his eating session.

With continued reference to FIGS. 1 and 2, determining module 138 includes a set of programming instructions in food tracking program 130. The set of programming instructions is executable by a processor. Determining module 138 determines a final weight of the contents on the tray when the tray is no longer associated with the user (step 208).

In various embodiments, detecting module 134 may be capable of detecting that the user has left the table for a threshold amount of time, and disassociating the user with the table and the tray. Based on detecting that the user has left the table, determining module 138 may be capable of determining a final weight of the contents on the tray, and communicating the first weight, the second weight, and the final weight of the contents on the tray to a server.

Referring back to the illustrative example above, Joe originally took a quarter of a pound of mashed potatoes, a half a pound of rice, and a pound of chicken for lunch. The table sensors on smart table 140 recorded the initial weight of Joe's lunch at 1 pound and three-quarters. As Joe finished off a few bites of his mashed potatoes, his half a pound of rice to the last grain, and half a pound of the chicken, Joe left the table with his tray to fill up on more mashed potatoes. Since Joe was only gone from the smart table 140 for 10 minutes, the eating session was not terminated. Instead, a second weight was recorded when Joe left. Joe set his tray back on the table upon his return, and the new detected weight of his tray was incorporated into his eating session. As such, food tracking program 130 incorporated the additional one-half pound of mashed potatoes to Joe's tray, while still accounting for the prior food consumption of rice and chicken prior to Joe leaving the smart table 140 to get a second serving. Joe finished all of his mashed potatoes and rice but left half a pound of chicken on his tray when he completed eating his meal. Joe's food consumption, and food waste, is transmitted to food tracking program 130 in real-time.

In exemplary embodiments, determining module 138 may be capable of detecting one or more types of food, together with a corresponding food weight for the one or more types of food at an initial time, on the tray associated with the user, and determining a final food weight for the one or more types of food at a final time, on the tray associated with the user.

In exemplary embodiments, determining module 138 may be capable of recommending a reduction, and an increase, of the one or more types of food based on the final food weight for the one or more types of food on the tray associated with the user.

In an exemplary embodiment, network 102 is a communication channel capable of transferring data between connected devices and may be a telecommunications network used to facilitate telephone calls between two or more parties comprising a landline network, a wireless network, a closed network, a satellite network, or any combination thereof. In another embodiment, network 102 may be the Internet, representing a worldwide collection of networks and gateways to support communications between devices connected to the Internet. In this other embodiment, network 102 may include, for example, wired, wireless, or fiber optic connections which may be implemented as an intranet network, a local area network (LAN), a wide area network (WAN), or any combination thereof. In further embodiments, network 102 may be a Bluetooth® (Bluetooth and all Bluetooth-based trademarks and logos are trademarks or registered trademarks of Bluetooth SIG, Inc. and/or its affiliates) network, an IoT network, a WiFi network, or a combination thereof. In general, network 102 can be any combination of connections and protocols that will support communications between computing device 110, server 120, smart table 140, and tray NFC tag 150.

Figure 3:
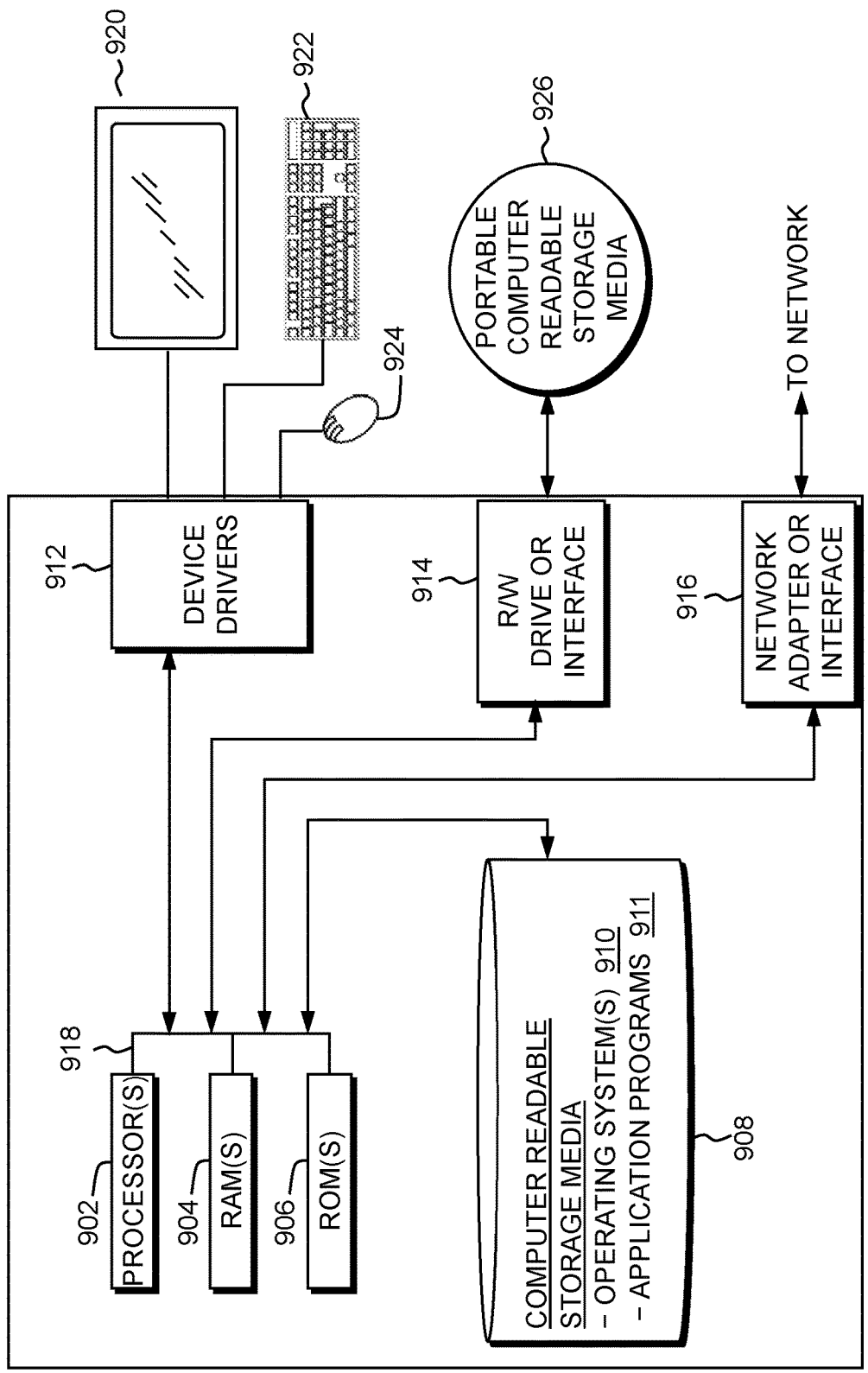
FIG. 3 is a diagram graphically illustrating the hardware components of the food tracking computing environment of FIG. 1, in accordance with an embodiment of the present invention.

FIG. 3 is a block diagram depicting components of a computing device in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Computing device of FIG. 3 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as food tracking program 130, may be stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device of FIG. 3 may also include a R/W drive or interface 914 to read from and write to one or more portable computer readable storage media 926. Application programs 911 on computing device may be stored on one or more of the portable computer readable storage media 926, read via the respective R/W drive or interface 914 and loaded into the respective computer readable storage media 908.

Computing device of FIG. 3 may also include a network adapter or interface 916, such as a TCP/IP adapter card or wireless communication adapter (such as a 4G wireless communication adapter using OFDMA technology). Application programs 911 on computing device of FIG. 3 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device of FIG. 3 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
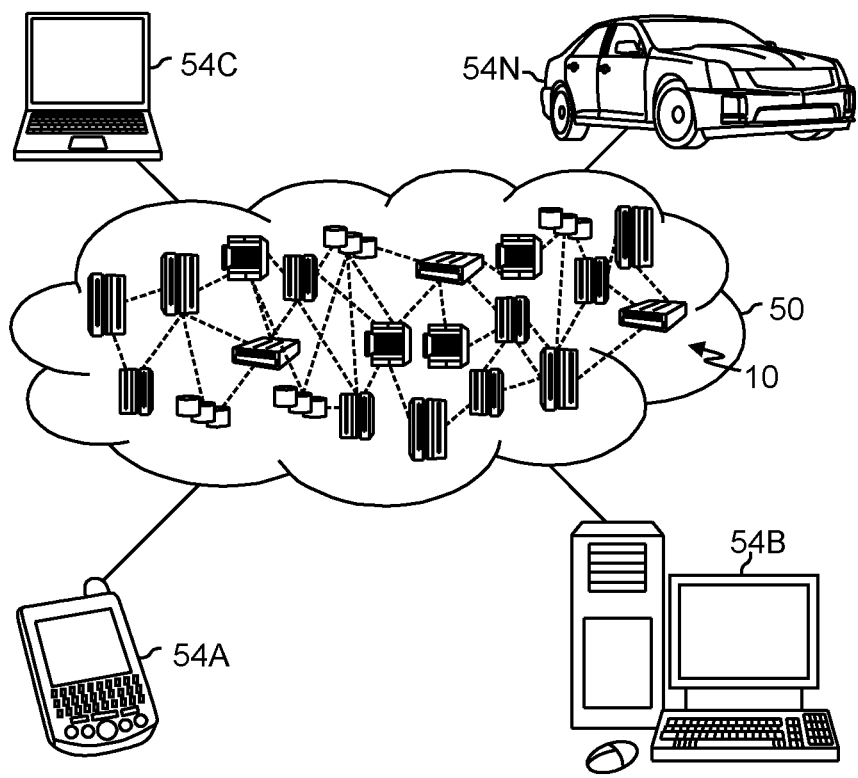
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
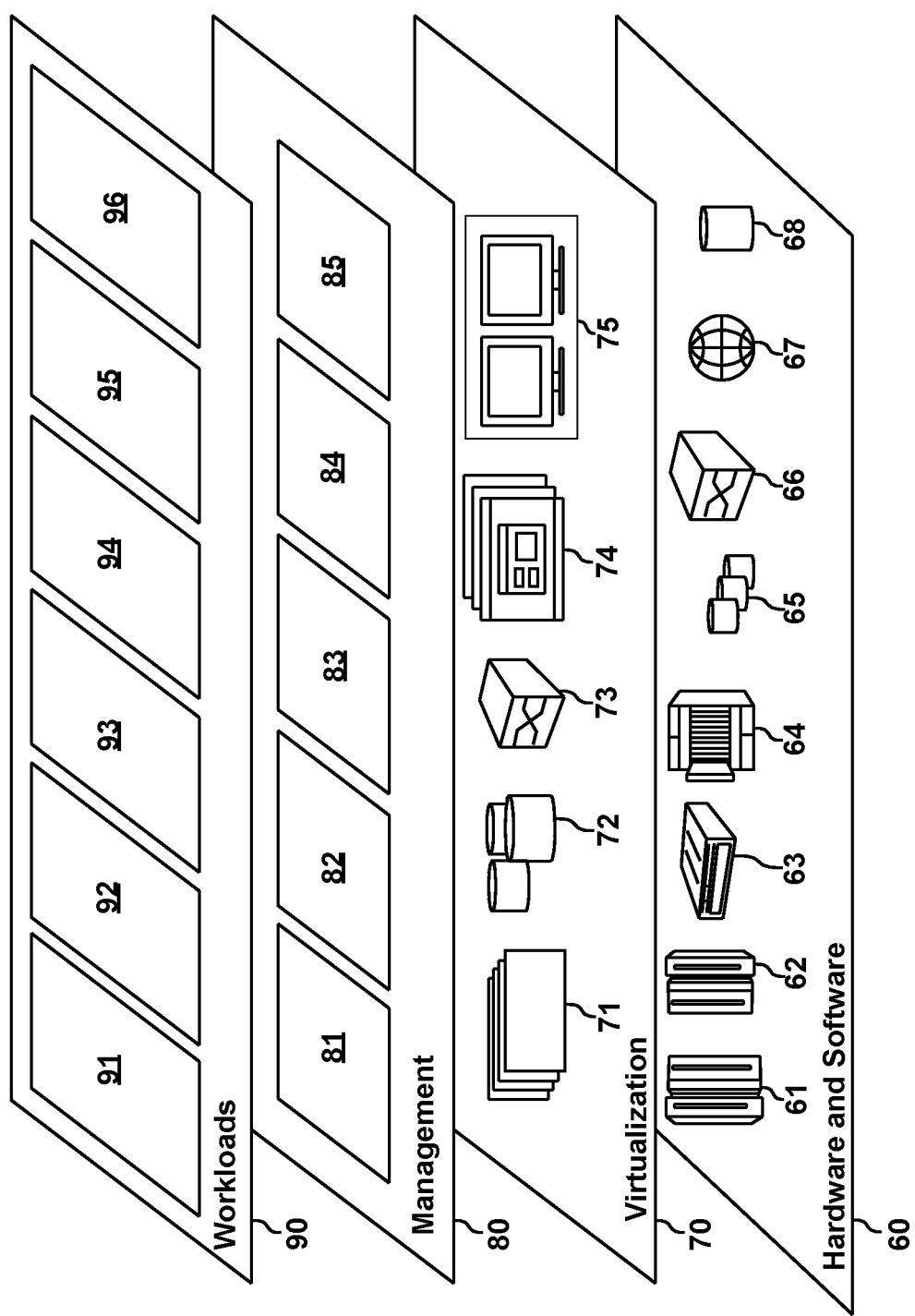
FIG. 5 depicts abstraction model layers of the illustrative cloud computing environment of FIG. 4, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and analytics services 96, including those described in connection with FIGS. 1-5.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for operating a set of electronic sensors, comprising:
   associating one or more types of food with one or more serving stations;
   detecting the user visiting at least one of the one or more serving stations;
   detecting, by a scale associated with each of the one or more serving stations, a weight of the one or more types of food added to the tray based on a weight change of the tray;
   detecting, by one or more sensors embedded in a table, that a tray associated with a user is placed on the table for an eating session, wherein the one or more sensors embedded in the table are arranged in a grid, and wherein the grid includes one or more squares and one or more radio frequency identification (RFID) sensors associated with each of the one or more squares;

associating, continuously, the tray associated with the user when the user switches from one seat to another seat at the table;

determining a first weight of contents on the tray at a first time during the eating session based on the weight change of the tray at the one or more serving stations;

detecting, by the one or more sensors embedded in the table, a second weight of the contents on the tray at a second time during the eating session;

determining a final food weight for the one or more types of food at a final time, on the tray associated with the user;

terminating the eating session of the user when the one or more sensors associated with the table no longer detect the tray of the user at the table for a threshold amount of time;

determining a final weight of the contents on the tray when the tray is no longer associated with the user, wherein the final weight of the contents of the tray specify a weight breakdown of food items associated with the user; and transmitting the determined weight breakdown of food items remaining on the tray associated with the user.

2. The computer-implemented method of claim 1, wherein the tray comprises a near-field communication (NFC) chip that communicates with a device of the user to form an association between the tray and the user.

3. The computer-implemented method of claim 1, wherein the table comprises a near-field communication (NFC) chip that communicates with a device of the user to form an association between the table and the user.

4. The computer-implemented method of claim 1, further comprising:
detecting that the user has left the table for a threshold amount of time; and
disassociating the user with the table and the tray.

5. The computer-implemented method of claim 4, further comprising:
determining a final weight of the contents on the tray; and
communicating the first weight, the second weight, and the final weight of the contents on the tray to a server.

6. The computer-implemented method of claim 1, further comprising:
detecting that the user, and the associated tray of the user, are away from the table for a threshold amount of time;
detecting, by the one or more sensors embedded in the table, that the tray of the user is placed on the table again;
detecting, by the one or more sensors embedded in the table, a third weight of the contents on the tray at a third time; and
determining a second final weight of the contents on the tray when the tray is no longer associated with the user, wherein the second final weight incorporates the third weight of the contents on the tray.

7. The computer-implemented method of claim 1, wherein the one or more sensors embedded in the table detect a weight and a temperature of the contents on the tray placed on the table.

8. The computer-implemented method of claim 7, wherein the table comprises a separate holder for one or more drinks, and wherein drink consumption, by the user, for the one or more drinks, is tracked separately from the consumption of the contents on the tray of the user.

9. The computer-implemented method of claim 1, further comprising:
determining a final food weight for the one or more types of food at a final time, on the tray associated with the user.

10. The computer-implemented method of claim 9, further comprising:
recommending a reduction, and an increase, of the one or more types of food based on the final food weight for the one or more types of food on the tray associated with the user.

11. A computer program product, comprising a non-transitory tangible storage device having program code embodied therewith, the program code executable by a processor of a computer to perform a method, the method comprising:
associating one or more types of food with one or more serving stations;
detecting the user visiting at least one of the one or more serving stations;
detecting, by a scale associated with each of the one or more serving stations, a weight of the one or more types of food added to the tray based on a weight change of the tray;
detecting, by one or more sensors embedded in a table, that a tray associated with a user is placed on the table for an eating session, wherein the one or more sensors embedded in the table are arranged in a grid, and wherein the grid includes one or more squares and one or more radio frequency identification (RFID) sensors associated with each of the one or more squares;
associating, continuously, the tray associated with the user when the user switches from one seat to another seat at the table;
determining a first weight of contents on the tray at a first time during the eating session based on the weight change of the tray at the one or more serving stations;
detecting, by the one or more sensors embedded in the table, a second weight of the contents on the tray at a second time during the eating session;
terminating the eating session of the user when the one or more sensors associated with the table no longer detect the tray of the user at the table for a threshold amount of time;
determining a final weight of the contents on the tray when the tray is no longer associated with the user, wherein the final weight of the contents of the tray specify a weight breakdown of food items associated with the user; and
transmitting the determined weight breakdown of food items remaining on the tray associated with the user.

12. The computer program product of claim 11, further comprising:
detecting that the user has left the table for a threshold amount of time; and
disassociating the user with the table and the tray.

13. The computer program product of claim 12, further comprising:
determining a final weight of the contents on the tray; and
communicating the first weight, the second weight, and the final weight of the contents on the tray to a server.

14. The computer program product of claim 11, further comprising:
detecting that the user, and the associated tray of the user, are away from the table for a threshold amount of time;

detecting, by the one or more sensors embedded in the table, that the tray of the user is placed on the table again;

detecting, by the one or more sensors embedded in the table, a third weight of the contents on the tray at a third time; and determining a second final weight of the contents on the tray when the tray is no longer associated with the user, wherein the second final weight incorporates the third weight of the contents on the tray.

15. The computer program product of claim 11, further comprising:

determining a final food weight for the one or more types of food at a final time, on the tray associated with the user.

16. A computer system, comprising:

one or more computer devices each having one or more processors and one or more tangible storage devices; and a program embodied on at least one of the one or more storage devices, the program having a plurality of program instructions for execution by the one or more processors, the program instructions comprising instructions for:

associating one or more types of food with one or more serving stations;

detecting the user visiting at least one of the one or more serving stations;

detecting, by a scale associated with each of the one or more serving stations, a weight of the one or more types of food added to the tray based on a weight change of the tray;

detecting, by one or more sensors embedded in a table, that a tray associated with a user is placed on the table for an eating session, wherein the one or more sensors embedded in the table are arranged in a grid, and wherein the grid includes one or more squares and one or more radio frequency identification (RFID) sensors associated with each of the one or more squares;

associating, continuously, the tray associated with the user when the user switches from one seat to another seat at the table;

determining a first weight of contents on the tray at a first time during the eating session based on the weight change of the tray at the one or more serving stations;

detecting, by the one or more sensors embedded in the table, a second weight of the contents on the tray at a second time during the eating session;

terminating the eating session of the user when the one or more sensors associated with the table no longer detect the tray of the user at the table for a threshold amount of time;

determining a final weight of the contents on the tray when the tray is no longer associated with the user, wherein the final weight of the contents of the tray specify a weight breakdown of food items associated with the user; and transmitting the determined weight breakdown of food items remaining on the tray associated with the user.

17. The computer system of claim 16, further comprising:

detecting that the user has left the table for a threshold amount of time; and disassociating the user with the table and the tray.

18. The computer system of claim 17, further comprising:

determining a final weight of the contents on the tray; and communicating the first weight, the second weight, and the final weight of the contents on the tray to a server.

* * * * *